UNITED STATES PATENT OFFICE.

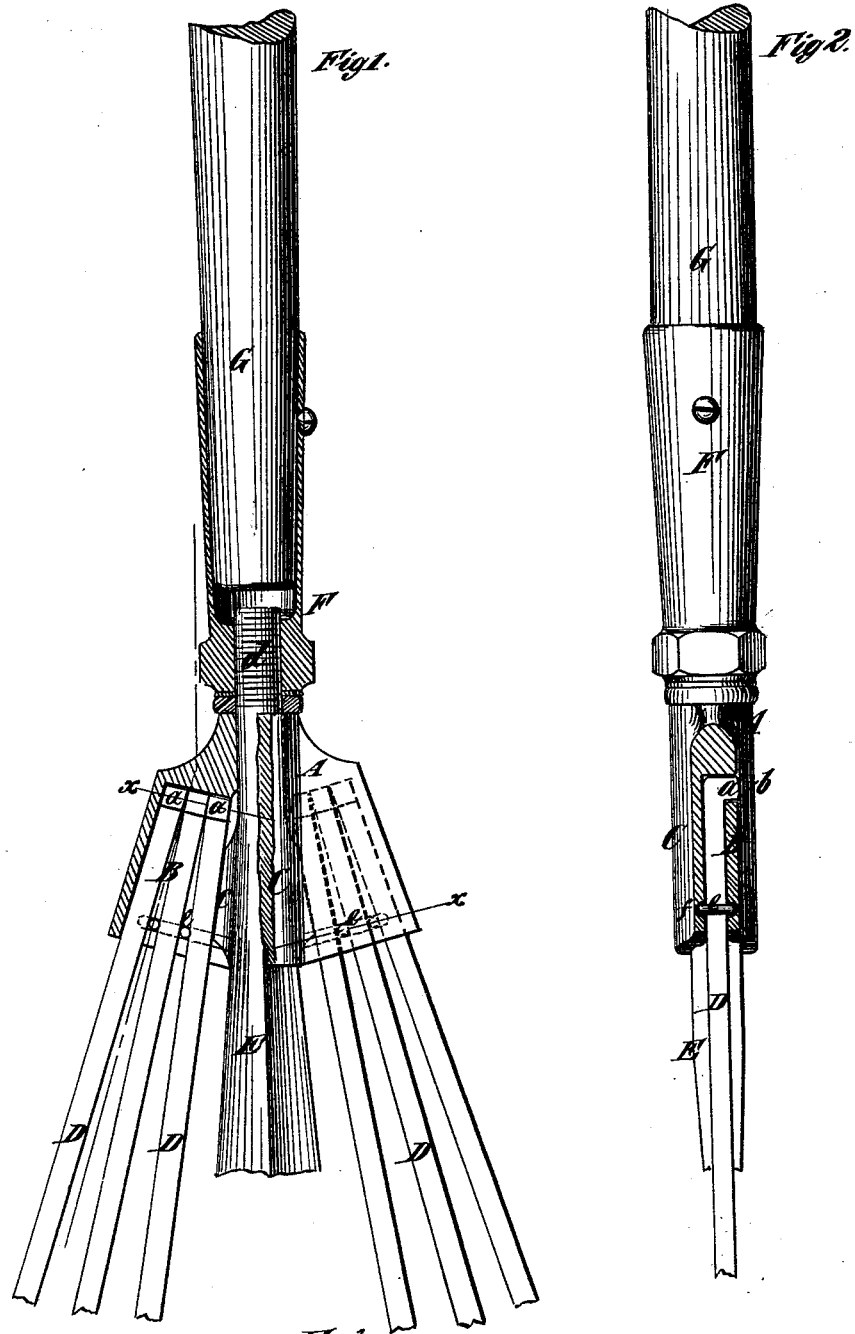

CHARLES M. KNOWLES, OF NEW LONDON, CONNECTICUT, ASSIGNOR OF ONE-HALF HIS RIGHT TO JONATHAN D. DOUGLASS, OF SAME PLACE.

IMPROVEMENT IN EEL-SPEARS.

Specification forming part of Letters Patent No. 218,540, dated August 12, 1879; application filed March 12, 1879.

*To all whom it may concern:*

Be it known that I, CHARLES M. KNOWLES, of New London, in the county of New London and State of Connecticut, have invented certain new and useful Improvements in Eel-Spears, of which the following is a specification.

The object of my invention is to produce an eel-spear in which the tines or barbs are held within the head of the spear by clamping, in such manner as to permit of their being simultaneously secured in the said head or released therefrom.

My invention consists in a spear-head having a central socket or mortise, in which a number of tines or barbs are held, a taper or wedge-like center-piece or fender fitting between certain of said tines or barbs in the spear-head, capable of longitudinal movement therein, and provided with a screw-thread and a handle engaging with said screw-thread, so that by turning the handle the tines or barbs are securely wedged and held in position by said center-piece or fender.

The said socket or mortise in the spear-head is provided upon its sides with transverse grooves, and the said tines or barbs are provided with heads upon their ends fitting in said transverse grooves.

It also consists in details of construction to be hereinafter described.

In the accompanying drawings, Figure 1 represents a partly-sectional side view of an eel-spear embodying my improvements; Fig. 2, an edge view, also partly in section; and Fig. 3, a transverse section on the irregular dotted line $x$ $x$, Fig. 1.

Similar letters of reference designate corresponding parts in all the figures.

A designates the spear-head. It is shown as provided with a socket or mortise, B, extending partly through it vertically, and also with a central chamber, C, which may be situated, as here represented, at about the middle of the socket or mortise B. D designates the spear tines or barbs, which are preferably of rectangular form in their cross-section, and of such size as to fit snugly within the side walls of the socket or mortise B, and at the same time to move freely in a lateral direction within the same. Only the inner portions of these tines or barbs are here represented, as their outer ends are formed similarly to ordinary spear-barbs.

Each tine or barb D is provided at its inner end with an enlarged portion or head, $a$, (shown clearly in Fig. 2,) which projects into a recess, $b$, formed in the side of the head, and is thereby held securely against longitudinal movement.

In order not to weaken the head, I preferably provide it with two recesses, $b$, one upon each side of the head. A number of tines or barbs will then have their heads $a$ projecting through one side of the spear-head, and a number through the other side thereof.

To hold the tines or barbs transversely I have here represented a center-piece or fender, E, fitting in the central opening C, and provided upon each side with projections $c$, having inclined or wedge-shaped faces impinging against the sides of the adjacent tines or barbs.

As the center-piece or fender is moved inward it tends to push all the tines or barbs on each side of it outward, and, as they are enabled to move freely laterally while held against longitudinal movement, they may be securely clamped in position.

The tines or barbs are introduced through the central opening C, and are then moved laterally into their places, their heads projecting through the recesses $b$ in the spear-head, and holding them longitudinally.

To effect the drawing-in movement of the center piece or fender E, I may make it of sufficient length to project above the head, and furnish its projecting portion with a screw-thread, $d$, upon which the ferrule F may be screwed.

G designates a portion of a handle inserted in the ferrule F, by which the spear is grasped.

In order to provide for holding the tines or barbs at a proper distance apart, I may employ a guard, which may be in the form of a staple, $e$, fitted over the center prong of the series on each side of the center-piece or fender E, and maintaining it in proper relation to the adjacent tines or barbs. These staples are clearly represented in Fig. 3, and are loosely fitted in transverse grooves $f$ in the inner walls of the socket or mortise B.

By my invention I provide an eel-spear which will not as readily become clogged with grass as the ordinary spear, and in which an extended bearing is afforded the tines or barbs. As the tines or barbs are secured by clamping, they are not reduced in strength, as would be the case if they were secured by screw-threads, and if they become rusted it will not interfere with their ready removal from the spear-head.

I am aware that hay-forks have been previously made having a rectangular mortise or socket with recesses in the narrow ends thereof and tines having heads upon their inner ends. In such case, however, only the two outside tines could be held by their heads fitting in the recesses, the rest being held by other means.

What I claim as my invention, and desire to secure by Letters Patent, is—

1. The combination, with a spear-head having within it a socket or mortise, of a series of tines or barbs fitting therein, a taper or wedge-like center-piece or fender capable of longitudinal movement in said spear-head, and provided with a screw-thread and a handle engaging with said screw-thread, whereby the handle may be secured to the spear and the tines or barbs wedged in place at one operation, substantially as specified.

2. The combination, with a spear-head, A, having within it a socket or mortise, B, provided upon its sides with recesses or grooves $b$, of a series of tines or barbs, D, provided upon their inner ends with heads $a$, fitting in said recesses or grooves, for securing said tines or barbs longitudinally, and a taper or wedge-like center-piece or fender, E, for securing them transversely in place, substantially as specified.

3. The combination, with a spear-head having within it a socket or mortise and a series of tines or barbs fitting therein and capable of transverse movement, of guards guided in grooves in the spear-head, and fitting between certain of said tines or barbs for holding them in proper relative position to each other, substantially as specified.

4. The combination of the spear-head A, provided with a socket or mortise, B, and central opening C, the tines or barbs D, having guards $e$ arranged between them, center-piece or fender E, and handle G, substantially as specified.

CHARLES M. KNOWLES.

Witnesses:
JAMES ALLYN,
JAMES H. HILL.